United States Patent
Song et al.

(10) Patent No.: US 10,840,541 B2
(45) Date of Patent: Nov. 17, 2020

(54) PRETREATMENT METHOD FOR LITHIUM ELECTRODE, AND LITHIUM METAL BATTERY

(71) Applicant: LG CHEM, LTD., Seoul (KR)

(72) Inventors: Jieun Song, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 24 days.

(21) Appl. No.: 16/314,252

(22) PCT Filed: Nov. 20, 2017

(86) PCT No.: PCT/KR2017/013178
§ 371 (c)(1),
(2) Date: Dec. 28, 2018

(87) PCT Pub. No.: WO2018/097555
PCT Pub. Date: May 31, 2018

(65) Prior Publication Data
US 2019/0157714 A1  May 23, 2019

(30) Foreign Application Priority Data
Nov. 24, 2016  (KR) .................. 10-2016-0157341

(51) Int. Cl.
*H01M 10/0525* (2010.01)
*H01M 10/0567* (2010.01)
(Continued)

(52) U.S. Cl.
CPC ..... *H01M 10/0525* (2013.01); *H01M 4/0416* (2013.01); *H01M 4/131* (2013.01);
(Continued)

(58) Field of Classification Search
CPC combination set(s) only.
See application file for complete search history.

(56) References Cited

U.S. PATENT DOCUMENTS 6,143,444 A * 11/2000 Roh .................. H01M 4/04
  429/217
6,372,388 B1 * 4/2002 Katsurao .............. C08L 27/16
  429/316
(Continued)

FOREIGN PATENT DOCUMENTS

JP   H10-096091 A   4/1998
JP   2008-004424 A  1/2008
(Continued)

OTHER PUBLICATIONS

International Search Report for PCT/KR2017/013178 (PCT/ISA/210) dated Feb. 22, 2018.

*Primary Examiner* — Kaity V Chandler
(74) *Attorney, Agent, or Firm* — Birch, Stewart, Kolasch & Birch, LLP

(57) ABSTRACT

A method for pretreating a lithium electrode, and a lithium metal battery, and in particular, a method for stabilizing a lithium electrode through pretreatment of being immersed in a composition for forming a solid electrolyte interphase, and a lithium metal battery including such a lithium electrode. Effects of decreasing interfacial resistance and enhancing Li charge and discharge efficiency are obtained when forming a solid electrolyte interphase (SEI) on a lithium electrode in advance using a pretreatment process of the lithium electrode, and then using the SEI layer-formed lithium electrode in a lithium metal battery.

14 Claims, 4 Drawing Sheets

(51) Int. Cl.
*H01M 10/42* (2006.01)
*H01M 4/134* (2010.01)
*H01M 4/1395* (2010.01)
*H01M 10/0569* (2010.01)
*H01M 4/131* (2010.01)
*H01M 4/04* (2006.01)
*H01M 10/052* (2010.01)
*H01M 4/62* (2006.01)
*H01M 4/36* (2006.01)

(52) U.S. Cl.
CPC ......... *H01M 4/134* (2013.01); *H01M 4/1395* (2013.01); *H01M 4/366* (2013.01); *H01M 4/62* (2013.01); *H01M 10/052* (2013.01); *H01M 10/0567* (2013.01); *H01M 10/0569* (2013.01); *H01M 10/42* (2013.01); *Y02E 60/10* (2013.01); *Y02T 10/70* (2013.01)

(56) References Cited

U.S. PATENT DOCUMENTS

| | | | |
|---|---|---|---|
| 6,391,069 B1 * | 5/2002 | Gozdz | H01M 10/0525 29/623.3 |
| 2002/0036131 A1 | 3/2002 | Kugai et al. | |
| 2003/0027048 A1 * | 2/2003 | Lu | H01M 4/505 429/231.1 |
| 2005/0147886 A1 * | 7/2005 | Mikhaylik | H01M 4/382 429/218.1 |
| 2007/0054193 A1 | 3/2007 | Ota | |
| 2007/0082264 A1 | 4/2007 | Mikhaylik | |
| 2009/0136845 A1 * | 5/2009 | Choi | H01M 4/0414 429/212 |
| 2013/0288130 A1 | 10/2013 | Sheem et al. | |
| 2015/0099167 A1 * | 4/2015 | Oshima | H01M 4/525 429/199 |
| 2016/0072153 A1 | 3/2016 | Ichikawa et al. | |
| 2016/0254572 A1 | 9/2016 | Yu et al. | |
| 2016/0294006 A1 * | 10/2016 | Onizuka | H01M 4/13 |
| 2017/0271694 A1 | 9/2017 | Jeong et al. | |
| 2018/0114968 A1 * | 4/2018 | Joo | H01M 2/1653 |

FOREIGN PATENT DOCUMENTS

| | | |
|---|---|---|
| JP | 5402363 B2 | 1/2014 |
| JP | 2016-058250 A | 4/2016 |
| KR | 10-2002-0017951 A | 3/2002 |
| KR | 10-2007-0021018 A | 2/2007 |
| KR | 10-1166274 B1 | 7/2012 |
| KR | 10-2013-0122469 A | 11/2013 |
| KR | 10-2014-0065712 A | 5/2014 |
| KR | 10-2016-0038735 A | 4/2016 |
| KR | 10-2016-0050222 A | 5/2016 |
| KR | 10-2016-0074430 A | 6/2016 |

* cited by examiner

[Figure 1]
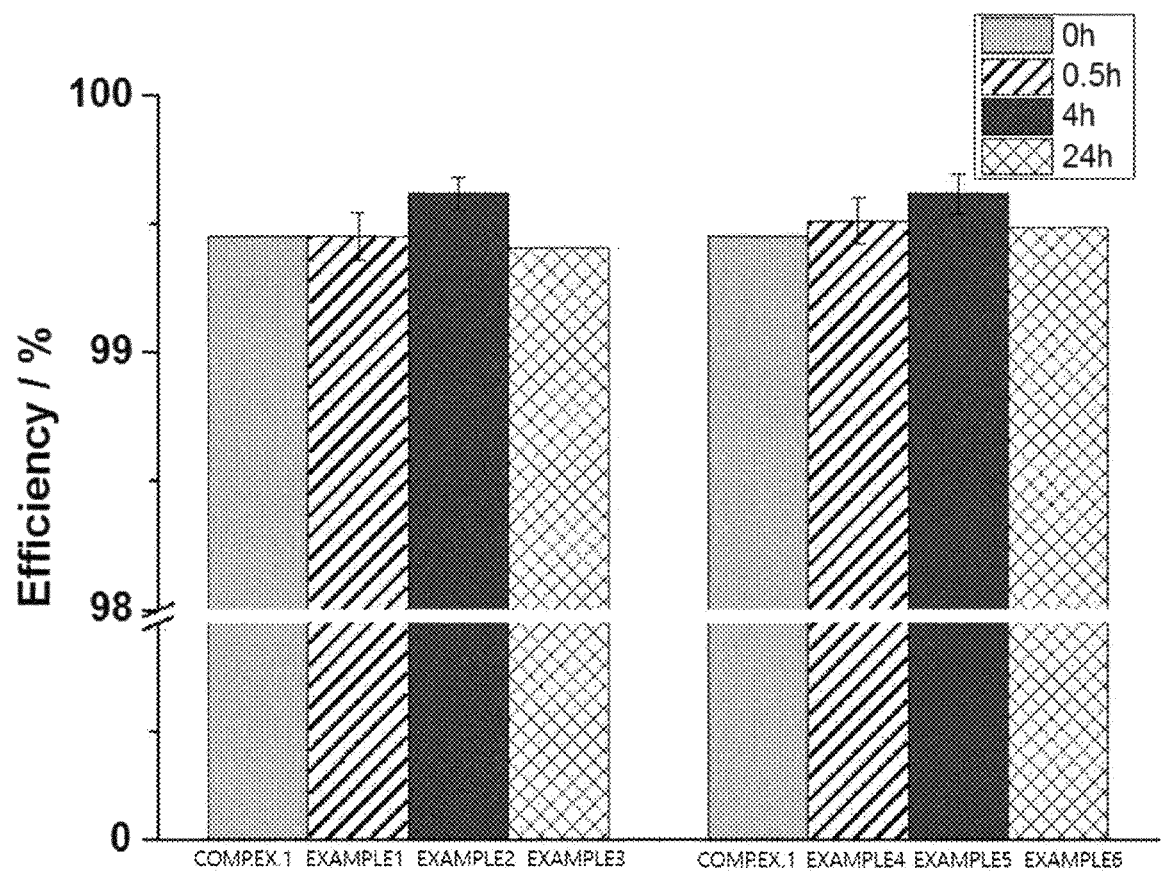

[Figure 2]
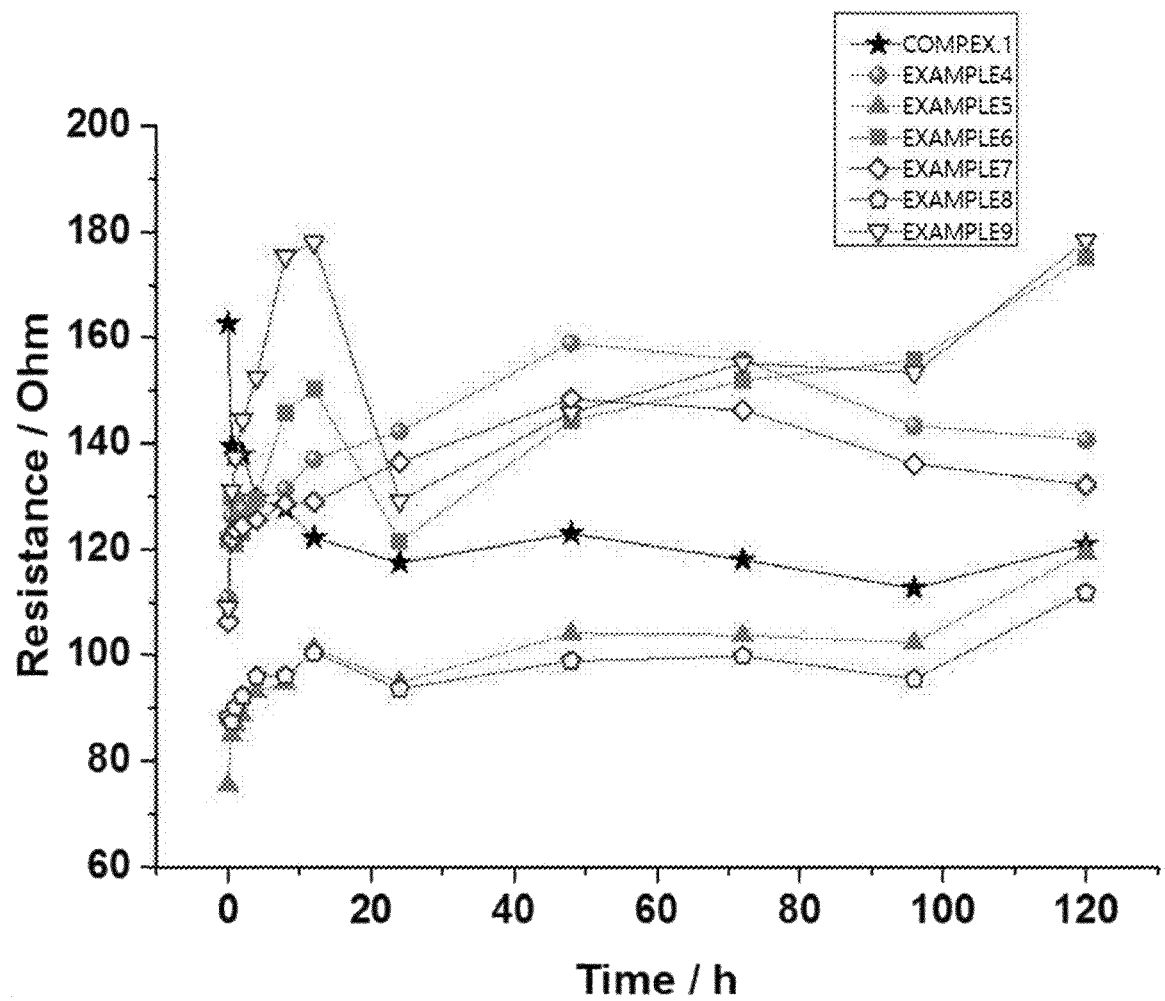

[Figure 3]
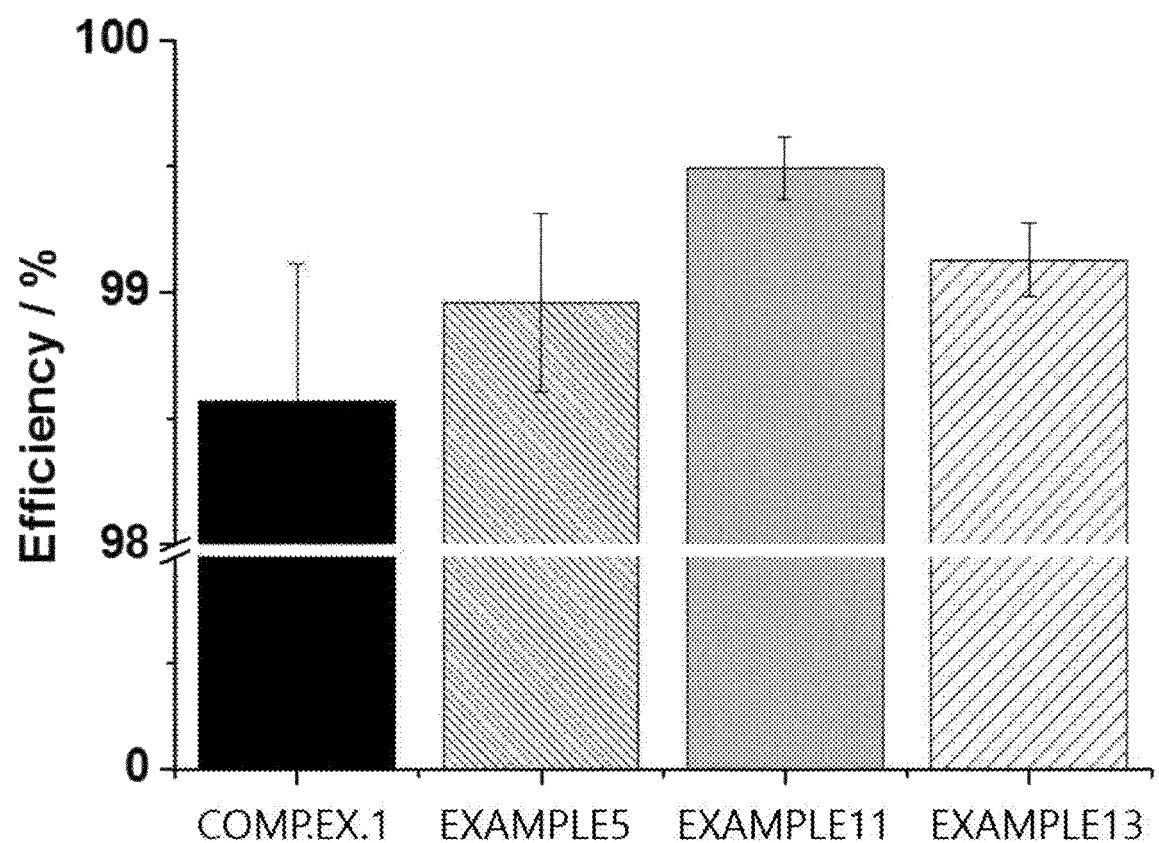

[Figure 4]
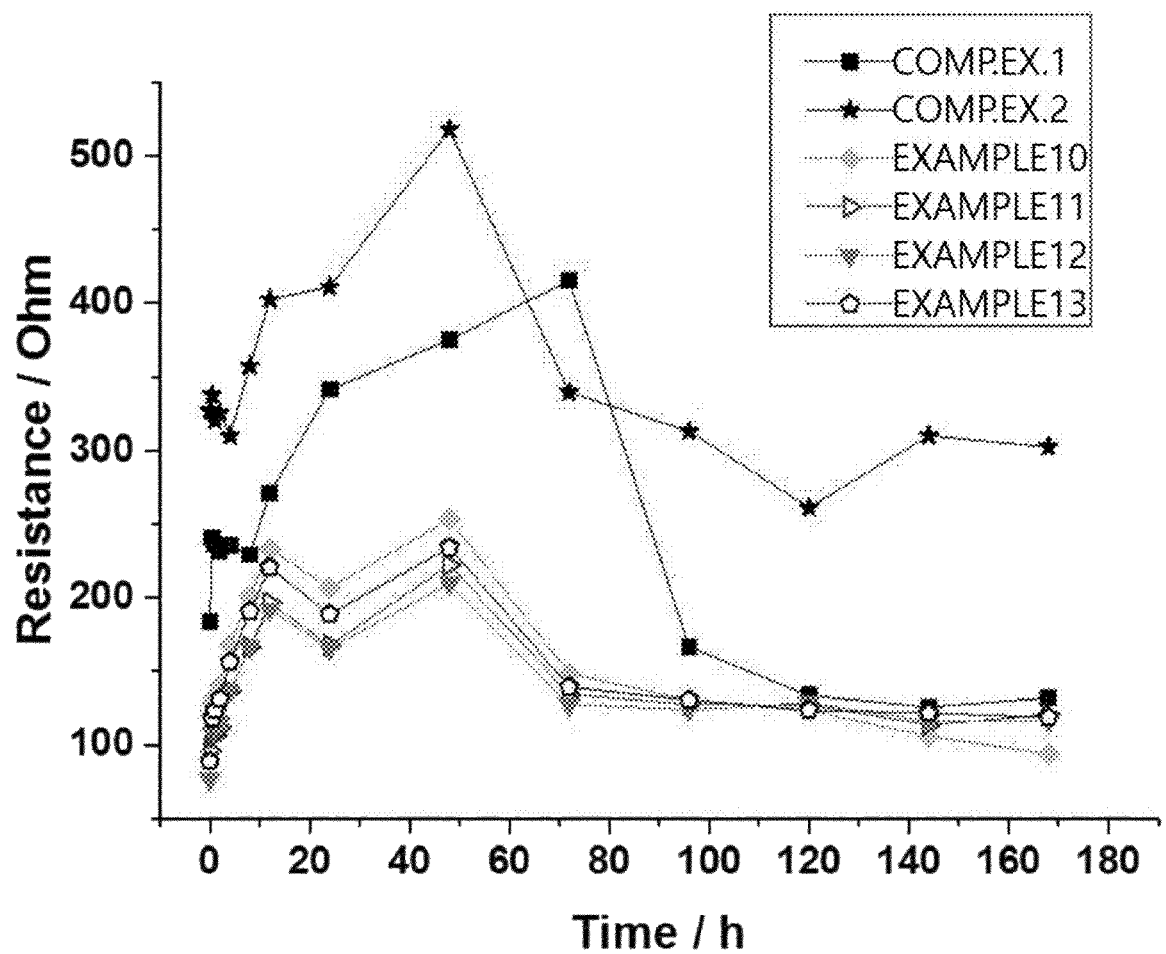

PRETREATMENT METHOD FOR LITHIUM ELECTRODE, AND LITHIUM METAL BATTERY

TECHNICAL FIELD

This application claims priority to and the benefits of Korean Patent Application No. 10-2016-0157341, filed with the Korean Intellectual Property Office on Nov. 24, 2016, the entire contents of which are incorporated herein by reference.

The present invention relates to a method for pretreating a lithium electrode, and a lithium metal battery, and in particular, to a method of stabilizing a lithium electrode through pretreatment of being immersed in a composition for forming a solid electrolyte interphase, and a lithium metal battery including such a lithium electrode.

BACKGROUND ART

An electrochemical system using lithium metal and a non-aqueous electrolyte as a base is known to be thermodynamically unstable, and as a result, a film formed with products obtained by an interaction between the lithium and the electrolyte component are formed on the lithium electrode surface. Properties of this film are determined by chemical properties of components forming the electrolyte system, and in various electrolytes, a passivating film may be formed on the lithium electrode surface, and this has a favorable protecting property for the electrolyte itself as well as having high ion conductivity for the lithium ions.

Typically, among secondary batteries, a lithium metal battery using lithium metal as a negative electrode has lithium ions being reduced on a lithium electrode surface during operation, and depending on the combination of a solvent and a lithium salt forming an electrolyte solution, a solid electrolyte interphase (SEI) with various compositions is formed on the lithium electrode and irreversibility occurs. However, when the SEI layer formed on the lithium electrode surface is unstable, a direct reaction between the electrolyte solution and the lithium electrode consistently occurs generating additional irreversibility, and this leads to a charge and discharge efficiency decrease of a battery. In addition, formation of the unstable SEI layer functions as a factor reducing a life time of a battery such as causing electrolyte solution depletion and producing gas as a byproduct.

PRIOR ART DOCUMENTS (Patent Document 1) Korean Patent Application Laid-Open Publication No. 2016-0050222 "Electrolyte solution for lithium metal battery and lithium metal battery including the same"

DISCLOSURE

Technical Problem

Accordingly, an aspect of the present invention provides a pretreatment method for forming a stable solid electrolyte interphase (SEI) on a lithium electrode.

Technical Solution

According to an aspect of the present invention, there is provided a method for pretreating a lithium electrode, which pretreats a lithium electrode by being immersed in a composition for forming a solid electrolyte interphase (SEI). The composition for forming a solid electrolyte interphase may use an ether-based solvent alone, may mix a lithium salt to an ether-based solvent, or may combine three types of components of an ether-based solvent, a lithium salt and an additive.

According to another aspect of the present invention, there is provided a lithium metal battery including the stabilized lithium electrode.

Advantageous Effects

According to the present invention, effects of decreasing interfacial resistance and enhancing Li charge and discharge efficiency are obtained when forming such a solid electrolyte interphase (SEI) on a lithium electrode in advance using a pretreatment process of the lithium electrode, and then using the SEI layer-formed lithium electrode in a lithium metal battery.

DESCRIPTION OF DRAWINGS

FIG. 1 shows data on efficiency of Examples 1 to 6 and Comparative Example 1 of the present invention depending on immersing time.

FIG. 2 shows data on changes in the interfacial resistance of immersing-pretreated lithium metal electrodes of Examples 4 to 9 and Comparative Example 1 of the present invention depending on aging time.

FIG. 3 shows data on efficiency comparing Comparative Example 1, Example 5, Examples 11 and 13 of the present invention depending on a SEI layer forming effect.

FIG. 4 shows data on interfacial resistance of immersing-pretreated lithium metals of Examples 10 to 13 and Comparative Examples 1 and 2 of the present invention depending on aging time.

BEST MODE

The present invention provides a method for pretreating a lithium electrode, which pretreats a lithium electrode by being immersed in a composition for forming a solid electrolyte interphase (SEI). Hereinafter, the present invention will be specifically described.

Composition for Forming Solid Electrolyte Interphase (SEI)

In the present invention, the composition for forming a SEI is for immersing and thereby pretreating lithium metal before manufacturing a lithium metal battery, and is based on a non-aqueous organic solvent. The non-aqueous organic solvent is a medium through which ions involved in an electrochemical reaction of a battery are capable of migrating. In addition, the SEI layer suppresses electrolyte decomposition on a lithium electrode surface and thereby lowers interfacial resistance between the electrode and the electrolyte, and performs a role of a protective layer stabilizing the electrode.

According to one embodiment of the present invention, one or more types of ether-based solvents may be used as the non-aqueous organic solvent. The ether-based solvent is preferred in activating an oxidation-reduction reaction for forming a SEI layer by increasing a degree of dissociation of an added lithium salt by chelating lithium cations with a symmetric structure of the ether, and significantly increasing lithium ion conductivity in the composition for forming a SEI, while decreasing viscosity of the composition for forming a SEI. Ion conductivity is generally determined depending on the mobility of ions in an electrolyte solution, and therefore, solvent viscosity and ion concentration in the solution are factors affecting ion conductivity. As the viscosity of the composition for forming a SEI decreases, ion migration is unrestricted in the solution and ion conductivity increases, and as the ion concentration in the composition for forming a SEI increases, the amounts of ions, a charge transporter, increases resultantly increasing ion conductivity. For such reasons, the ether-based solvent facilitates formation of a more stable SEI layer on the lithium electrode, and as a result, more enhanced charge and discharge efficiency is obtained and interfacial resistance decreases.

Herein, the ether-based solvent includes an acyclic ether, a cyclic ether, a polyether or a mixture thereof, and preferably a cyclic ether or a C4 to C10 ether and more preferably a C4 to C10 cyclic ether. The cyclic ether readily forms a polymer as the ring opens, and particularly, a SEI layer having a proper thickness is formed in the C4 to C10 cyclic ether. Since Li metal is an active material, using a solvent with no reactivity is favored, however, consistently making a thin SEI layer using a solvent helps preventing lithium metal depletion caused by a side reaction, and stably operating a battery.

Nonlimiting examples of the cyclic ether may be selected from the group of dioxolane (DOL), methyl dioxolane, oxane, dioxane, trioxane, tetrahydrofuran (THF), dihydropyran (DHP), tetrahydropyran (THP), methyltetrahydrofuran, furan and methylfuran.

Nonlimiting examples of the acyclic ether may be selected from the group of diethyl ether, dipropyl ether, dibutyl ether, dimethoxymethane (DMM), trimethoxymethane (TMM), dimethoxyethane (DME), diethoxyethane (DEE) and dimethoxypropane (DMP).

Nonlimiting examples of the polyether may be selected from the group of diethylene glycol dimethyl ether, triethylene glycol dimethyl ether, tetraethylene glycol dimethyl ether, ethylene glycol divinyl ether, ethylene glycol ethylmethyl ether, diethylene glycol divinyl ether, triethylene glycol divinyl ether, dipropylene glycol dimethylene ether and butylene glycol ether.

More specifically, the ether-based solvent may be 1,3-dioxolane, 1,2-dimethoxyethane, furan, 2-methylfuran, 2,5-dimethylfuran, tetrahydrofuran, ethylene oxide, 1,4-oxane, 4-methyl-1,3-dioxolane, tetraethylene glycol dimethyl ether or a mixed solvent thereof.

Preferably, one type may be selected from each of the acyclic ether and the cyclic ether and mixed, and more preferably, 1,3-dioxolane and 1,2-dimethoxyethane are mixed in a certain mixing ratio, and as one example, a solution mixing these in 1:1 in a weight ratio may be used.

Meanwhile, the composition for forming a SEI according to one embodiment of the present invention includes a lithium salt dispersed into the non-aqueous organic solvent.

The lithium salt is not particularly limited as long as it is commonly used in a lithium metal battery. For example, the lithium salt may be one or more types of compounds selected from the group consisting of LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, chloroborane lithium, lower aliphatic carboxylic acid lithium, lithium tetraphenylborate, lithium imide and combinations thereof. Preferably, $LiN(FSO_2)_2$(LiFSI) is used. Such a lithium salt improves an initial output property and low temperature and high temperature output properties by forming the solid and stable SEI layer described above on the lithium electrode surface.

The lithium salt concentration may be determined considering ion conductivity and the like, and, within the range of 0.05 M to 5.0 M, is preferably from 0.2 M to 2.0 M, or from 0.5 M to 1.6 M. In other words, in order to secure ion conductivity for forming a stable SEI layer, the lithium salt concentration is preferably 0.05 M or greater. However, when the lithium salt is added in excess, electrolyte solution viscosity increases decreasing lithium ion mobility, and as a result, a stable SEI layer may not be formed since an oxidation-reduction reaction may not smoothly occur. Therefore, the lithium salt concentration is preferably 5.0 M or less.

In the composition for forming a SEI according to one embodiment of the present invention, an additive dispersed together with the lithium salt described above is included in the ether-based solvent. Particularly, the additive may be a nitrate compound. The nitrate compound is effective in forming a stable SEI layer on a lithium electrode, and greatly enhancing charge and discharge efficiency. Such a nitrate compound is not particularly limited in the present invention, however, one or more types selected from the group consisting of inorganic nitrate compound such as lithium nitrate ($LiNO_3$) or lithium nitrite ($LiNO_2$); organic nitrate compound such as nitromethane ($CH_3NO_2$) or methyl nitrate ($CH_3NO_3$); and combinations thereof may be used, and preferably, lithium nitrate ($LiNO_3$) is used.

The additive included in the composition for forming a SEI is used in 0.01% by weight to 10% by weight and preferably in 0.1% by weight to 5% by weight in 100% by weight of the whole electrolyte composition. When the content is less than the above-mentioned range, an effect of enhancing battery performance may not be sufficiently obtained, and when the content is greater than the above-mentioned range, composition viscosity increases decreasing lithium ion mobility, and resistance may increase due to the film declining battery performance. Accordingly, the content is properly controlled within the above-mentioned range.

As described above, the composition for forming a SEI according to one embodiment of the present invention uses the ether-based solvent alone as a first embodiment, mixes the lithium salt to the ether-based solvent as a second embodiment, or combining three types of components of the ether-based solvent, the lithium salt and the additive as a third embodiment, and preparing the composition for forming a SEI according to the third embodiment is most preferred in strengthening lithium metal stability.

The thickness of the SEI layer formed on the lithium electrode is preferably formed in a range of 0.025% to 2.5% with respect to the thickness of the lithium electrode, and specifically, may be from 10 nm to 10 μm. When the thickness is less than the above-mentioned range, an effect of protecting the lithium electrode is insignificant, and when the thickness is greater than the above-mentioned range, an adverse effect of increasing interfacial resistance is obtained.

As the time of immersing the lithium electrode in the composition for forming a SEI increases, the SEI layer is formed to be thick, and for example, the SEI layer may be stably formed on the lithium electrode surface when immersing the lithium electrode for 0.5 hours to 24 hours, preferably for 1 hour to 12 hours and more preferably for 2 hours to 8 hours based on room temperature. In addition, the room temperature may be any temperature in a range of 5° C. to 35° C. The SEI layer formed as above performs a role of decreasing interfacial resistance and enhancing efficiency when operating a battery using the lithium electrode.

Lithium Metal Battery

The lithium electrode pretreated by being immersed in the composition for forming a SEI described above may be used in various lithium metal batteries using lithium metal as a negative electrode. More specifically, the lithium metal battery may be a lithium-sulfur battery, a lithium air battery, an all-solid-state battery or the like. In the lithium metal battery according to present invention, constitutions other than the negative electrode described above may be prepared through known technologies by those skilled in the art, and hereinafter, specific descriptions will be provided.

According to one embodiment of the present invention, the lithium metal battery includes a case, an electrode assembly located inside the case and including a positive electrode, a negative electrode and a separator provided between the positive electrode and the negative electrode, and the electrolyte injected into the case.

In addition, according to one embodiment of the present invention, the lithium metal may be used as the negative electrode of the lithium metal battery in a thin film form to have its one surface adjoining a negative electrode current collector.

The negative electrode current collector is not particularly limited as long as it has high conductivity without inducing chemical changes to a battery, and may be any one metal selected from the group consisting of copper, aluminum, stainless steel, zinc, titanium, silver, palladium, nickel, iron, chromium, alloys thereof and combinations thereof. The stainless steel may have its surface treated with carbon, nickel, titanium or silver, and aluminum-cadmium alloys may be used as the alloy, and in addition thereto, baked carbon, nonconductive polymers of which surface is treated with a conductor, conductive polymers or the like may also be used. A copper thin plate is generally used as the negative electrode current collector.

The negative electrode current collector generally has a thickness range of 3 μm to 500 μm. When the negative electrode current collector has a thickness of less than 3 μm, a current collecting effect is reduced, and the thickness being greater than 500 μm has a problem of declining processibility when assembling the cell through folding. As necessary, a lithium negative electrode is used alone without using the current collector.

As for the positive electrode according to the present invention, a composition including a positive electrode active material, a conductor and a binder may be formed on a positive electrode current collector in a film form and prepared into a positive electrode form.

The positive electrode active material may include elemental sulfur (S8), sulfur series compounds or mixtures thereof, and these may also be composited with a conductor since a sulfur material itself does not have electrical conductivity. The sulfur series compound may be specifically selected from among $Li_2S_n$ (n≥1), organosulfur compounds, carbon-sulfur polymers (($C_2S_x)_n$: x=2.5 to 50, n≥2) or the like. The conductor may be used without limit as long as it has porosity and conductivity, and for example, carbon-based materials having porosity may be used.

As the positive electrode active material, any one selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}MnyO_2$ (0≤y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$ and $LiFePO_4$, or a mixture of two or more types thereof may be used. In addition, sulfides, selenides, halides and the like may also be used in addition to such oxides.

The conductor is a component for further enhancing conductivity of the positive electrode active material, and nonlimiting examples thereof may include graphite such as natural graphite or artificial graphite; carbon black such as carbon black, acetylene black, ketjen black, channel black, furnace black, lamp black and thermal black; conductive fibers such as carbon fibers or metal fibers; fluorocarbon, aluminum and metal powders such as nickel powder; conductive whiskers such as zinc oxide and potassium titanate; conductive metal oxides such as titanium oxide; conductive materials such as polyphenylene derivatives, and the like.

The binder has functions of keeping the positive electrode active material on the positive electrode current collector, and organically linking the positive electrode active materials, and examples thereof may include polyvinylidene fluoride (PVDF), polyacrylic acid (PAA), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The separator according to the present invention is not particularly limited in the material and, as a material physically separating a positive electrode and a negative electrode and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte are particularly preferred. For example, a polyolefin-based porous membrane or non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be included.

As the non-woven fabric other than the polyolefin-based non-woven fabric described above, non-woven fabrics formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyetheretherketone, polyester and the like alone, or formed with a polymer mixing these may be used, and, as a fiber form forming a porous web, such a non-woven fabric includes a spunbond or meltblown form formed with long fibers.

The thickness of the separator is not particularly limited, but is preferably in a range of 1 μm to 100 μm and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1

μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

The electrolyte capable of being used in the present invention may be a liquid non-aqueous electrolyte, or a polymer electrolyte such as a solid electrolyte or a gel electrolyte. In the former, the non-aqueous electrolyte battery may be formed as a lithium ion secondary battery, and in the latter, the non-aqueous electrolyte battery may be formed as a polymer electrolyte battery such as a polymer solid electrolyte or a polymer gel electrolyte.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

The concentration of the lithium salt included in the non-aqueous liquid electrolyte is preferably from 0.1 mol/L to 5 mol/L and more preferably from 0.5 mol/L to 3.0 mol/L.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone, or as a mixture of two or more types thereof. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

In addition, specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous liquid electrolyte may be injected at a proper stage in an electrochemical device manufacturing process depending on a manufacturing process and required properties of a final product. In other words, the non-aqueous liquid electrolyte may be injected at a stage prior to assembling an electrochemical device or at a final stage of electrochemical device assembly.

The lithium metal battery according to the present invention may go through lamination (stack) and folding, processes of a separator and an electrode in addition to winding, a general process. In addition, the battery case may be a cylinder-type, a square-type, a pouch-type, a coin-type or the like.

As described above, the lithium metal battery according to the present invention stably exhibits excellent discharge capacity, output property and capacity retention rate, and therefore, is useful in the fields of portable devices such as mobile phones, notebook computers or digital cameras, electric vehicles such as hybrid electric vehicles (HEV), and the like.

According to another embodiment of the present invention, there is provided a battery module including the lithium metal battery as a unit cell, and a battery pack including the same. The battery module or the battery pack may be used as a power supply of any one or more medium to large-sized devices such as power tools; electric vehicles including electric vehicles (EV), hybrid electric vehicles (HEV) and plug-in hybrid electric vehicles (PHEV); or systems for power storage.

Hereinafter, the present invention will be described in detail with reference to examples in order to specifically describe the present invention. However, the examples according to the present invention may be modified to various different forms, and the scope of the present invention is not construed as being limited to the examples described below. The examples of the present invention are provided in order to more fully describe the present invention for those having average knowledge in the art.

EXAMPLES 1 TO 3

A lithium metal battery was manufactured using lithium electrodes pretreated by being immersed for each of 30 minutes, 4 hours and 24 hours in 1,2-dimethoxyethane (DME) as a negative electrode.

As a positive electrode, lithium metal pretreated in the same manner was used to form a Li symmetric cell. As an electrolyte, a liquid electrolyte dissolving a LiFSI salt in an ether-based solvent was used, and as a separator, a polyethylene-based separator was used to manufacture a battery in a coin-cell form.

EXAMPLES 4 TO 6

A lithium metal battery was manufactured in the same manner as in Example 1 using lithium electrodes pretreated by being immersed for each of 30 minutes, 4 hours and 24 hours in 1,3-dioxolane (DOL).

EXAMPLE 7 TO 9

A lithium metal battery was manufactured in the same manner as in Example 1 using lithium electrodes pretreated by being immersed for each of 30 minutes, 4 hours and 24 hours in a solvent mixing 1,3-dioxolane (DOL) and 1,2-dimethoxyethane (DME) in a weight ratio (w/w) of 1:1.

EXAMPLE 10

A lithium metal battery was manufactured in the same manner as in Example 1 using a lithium electrode pretreated by being immersed for 4 hours in a composition including 1 M LiFSI and 1 wt % $LiNO_3$ in 1,3-dioxolane (DOL).

EXAMPLE 11

A lithium metal battery was manufactured in the same manner as in Example 1 using a lithium electrode pretreated by being immersed for 4 hours in a composition including 1 M LiFSI and 2 wt % $LiNO_3$ in 1,3-dioxolane (DOL).

EXAMPLE 12

A lithium metal battery was manufactured in the same manner as in Example 1 using a lithium electrode pretreated by being immersed for 4 hours in a composition including 1 M LiFSI and 3 wt % $LiNO_3$ in 1,3-dioxolane (DOL).

EXAMPLE 13

A lithium metal battery was manufactured in the same manner as in Example 1 using a lithium electrode pretreated by being immersed for 4 hours in a composition including 1 M LiFSI and 4 wt % $LiNO_3$ in 1,3-dioxolane (DOL).

COMPARATIVE EXAMPLE 1

A lithium metal battery was manufactured in the same manner as in Example 1 using a lithium electrode that was not pretreated.

COMPARATIVE EXAMPLE 2

A lithium metal battery was manufactured in the same manner as in Example 1 using a lithium electrode pretreated by being immersed for 4 hours in a composition including 1 wt % $LiNO_3$ in 1,3-dioxolane (DOL).

EXPERIMENTAL EXAMPLE 1

Evaluation of Efficiency Depending on Immersing Time

After manufacturing a coin cell by forming a Li symmetric cell using each of the immersing-pretreated lithium metals of Examples 1 to 6 and Comparative Example 1, Li plating/stripping was repeated to evaluate lithium negative electrode efficiency until the lithium was completely consumed, and the results are shown in FIG. 1.

Examples 1, 2 and 3 show changes in the efficiency of the lithium electrodes immersed in a DME solvent depending on immersing time, and Examples 4, 5 and 6 show changes in the efficiency of the lithium electrodes immersed in a DOL solvent depending on immersing time. Based on the experimental results, it was identified that effects of enhancing efficiency greatly increased when immersed for approximately 4 hours in the pretreatment.

EXPERIMENTAL EXAMPLE 2

Evaluation of Interfacial Resistance Depending on Immersing Time

After manufacturing a coin cell by forming a Li symmetric cell using each of the immersing-pretreated lithium metals of Examples 4 to 9 and Comparative Example 1, changes in the interfacial resistance depending on time were measured using an electrochemical impedance spectroscopy (EIS) method, and the results are shown in FIG. 2.

FIG. 2 shows data observing changes in the interfacial resistance while aging in the actual compositions of lithium metal each immersed in DOL and DOL/DME (1:1 v/v) solvents. As in FIG. 1, it was identified that results of low and stable interfacial resistance of lithium metal were obtained in Example 5 and Example 8 immersed for approximately 4 hours.

EXPERIMENTAL EXAMPLE 3

Evaluation of Efficiency Depending on Lithium Salt and Additive Concentrations

After manufacturing a coin cell by forming a Li symmetric cell using each of the immersing-pretreated lithium metals of Comparative Example 1, Example 5, Example 11 and Example 13, Li plating/stripping was repeated to evaluate lithium negative electrode efficiency until the lithium was completely consumed, and the results are shown in FIG. 3.

When referring to FIG. 3, efficiency of the lithium negative electrode further increased in Example 5 immersed in 1,3-dioxolane (DOL) compared to Comparative Example 1 with no pretreatment, and in comparison, it was identified that efficiency of the lithium negative electrode greatly increased in Examples 11 and 13 immersed in a composition including the lithium salt and the additive. Particularly, Example 11 including the additive in 2% had a largest efficiency increase.

EXPERIMENTAL EXAMPLE 4

Evaluation of Interfacial Resistance Depending on Lithium Salt and Additive Concentrations After manufacturing a coin cell by forming a Li symmetric cell using each of the immersing-pretreated lithium metals of Examples 10 to 13 and Comparative Examples 1 and 2, changes in the interfacial resistance depending on time were measured using an electrochemical impedance spectroscopy (EIS) method, and the results are shown in FIG. 4.

When referring to FIG. 4, it was identified that interfacial resistance of Examples 11 and 12, a composition including the lithium salt, and the additive in 1 wt % to 4 wt %, was measured to be the lowest, whereas Comparative Example 2, a composition that does not include the lithium salt and includes the additive, had increased interfacial resistance compared to Comparative Example 1 with no heat treatment. Accordingly, it was seen that, in order to lower interfacial resistance of a lithium electrode, the lithium electrode needs to be immersed in a composition including the lithium salt and, in addition thereto, the additive in a proper amount.

The invention claimed is:

1. A method for pretreating a lithium electrode, comprising:
   immersing the lithium electrode in a composition for 2 hours to 8 hours to form a solid electrolyte interphase (SEI) having a thickness of 0.025% to 2.5% with respect to a thickness of the lithium electrode,
   wherein the composition comprises an ether-based solvent being at least one of an acyclic ether, a cyclic ether, or a polyether.

2. The method for pretreating a lithium electrode of claim 1, wherein the ether-based solvent is one or more acyclic ether selected from the group consisting of diethyl ether, dipropyl ether, dibutyl ether, dimethoxymethane (DMM), trimethoxymethane (TMM), dimethoxyethane (DME), diethoxyethane (DEE) and dimethoxypropane (DMP).

3. The method for pretreating a lithium electrode of claim 1, wherein the ether-based solvent is one or more cyclic ether selected from the group consisting of dioxolane (DOL), methyl dioxolane, oxane, dioxane, trioxane, tetrahydrofuran (THF), dihydropyran (DHP), tetrahydropyran (THP), methyltetrahydrofuran, furan and methylfuran.

4. The method for pretreating a lithium electrode of claim 1, wherein the ether-based solvent is one or more polyether selected from the group consisting of diethylene glycol dimethyl ether, triethylene glycol dimethyl ether, tetraethylene glycol dimethyl ether, ethylene glycol divinyl ether, ethylene glycol ethylmethyl ether, diethylene glycol divinyl ether, triethylene glycol divinyl ether, dipropylene glycol dimethylene ether and butylene glycol ether.

5. The method for pretreating a lithium electrode of claim 1, wherein the ether-based solvent is a C4 to C10 compound.

6. The method for pretreating a lithium electrode of claim 1, wherein the composition for forming a solid electrolyte interphase further includes a lithium salt.

7. The method for pretreating a lithium electrode of claim 6, wherein the lithium salt is one or more types selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, chloroborane lithium, lower aliphatic carboxylic acid lithium, lithium tetraphenylborate, lithium imide and combinations thereof.

8. The method for pretreating a lithium electrode of claim 6, wherein the lithium salt is included in a concentration of 0.05 M to 5 M in the whole composition for forming a solid electrolyte interphase.

9. The method for pretreating a lithium electrode of claim 1, wherein the composition for forming the solid electrolyte interphase further includes a lithium salt and an additive.

10. The method for pretreating a lithium electrode of claim 9, wherein the lithium salt is one or more types selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, chloroborane lithium, lower aliphatic carboxylic acid lithium, lithium tetraphenylborate, lithium imide and combinations thereof.

11. The method for pretreating a lithium electrode of claim 9, wherein the lithium salt is included in 0.05 M to 5 M in the whole composition for forming a solid electrolyte interphase.

12. The method for pretreating a lithium electrode of claim 9, wherein the additive is one or more types selected form the group consisting of inorganic-based nitrate compounds; organic-based nitrate compounds; and combinations thereof.

13. The method for pretreating a lithium electrode of claim 9, wherein the additive is included in 0.01% by weight to 10% by weight based on a total weight of the whole composition for forming a solid electrolyte interphase.

14. A lithium metal battery comprising a lithium electrode pretreated using the method of claim 1.

* * * * *